April 23, 1935.  W. D. BURGER  1,999,031
WORK HOLDER
Filed March 10, 1930  2 Sheets-Sheet 2
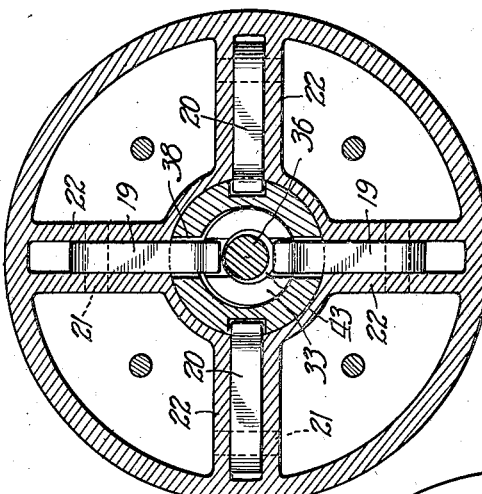
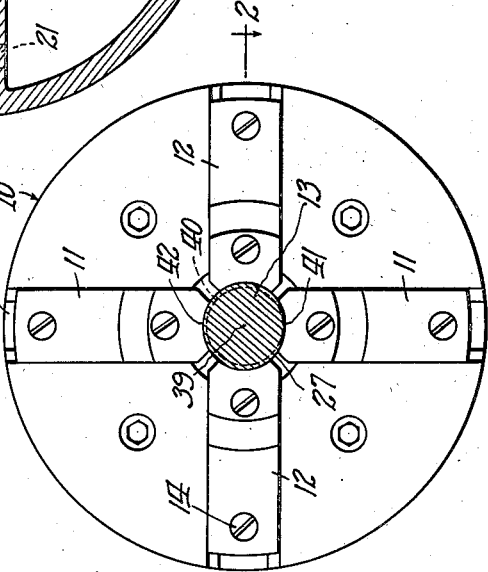
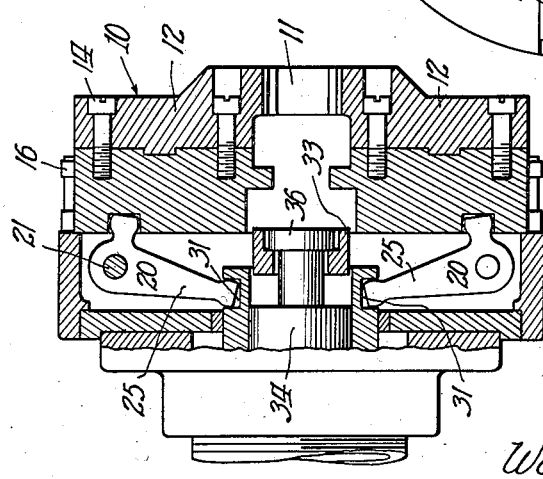
Inventor
Walter D. Burger
By Roland C. Rehm  Atty.

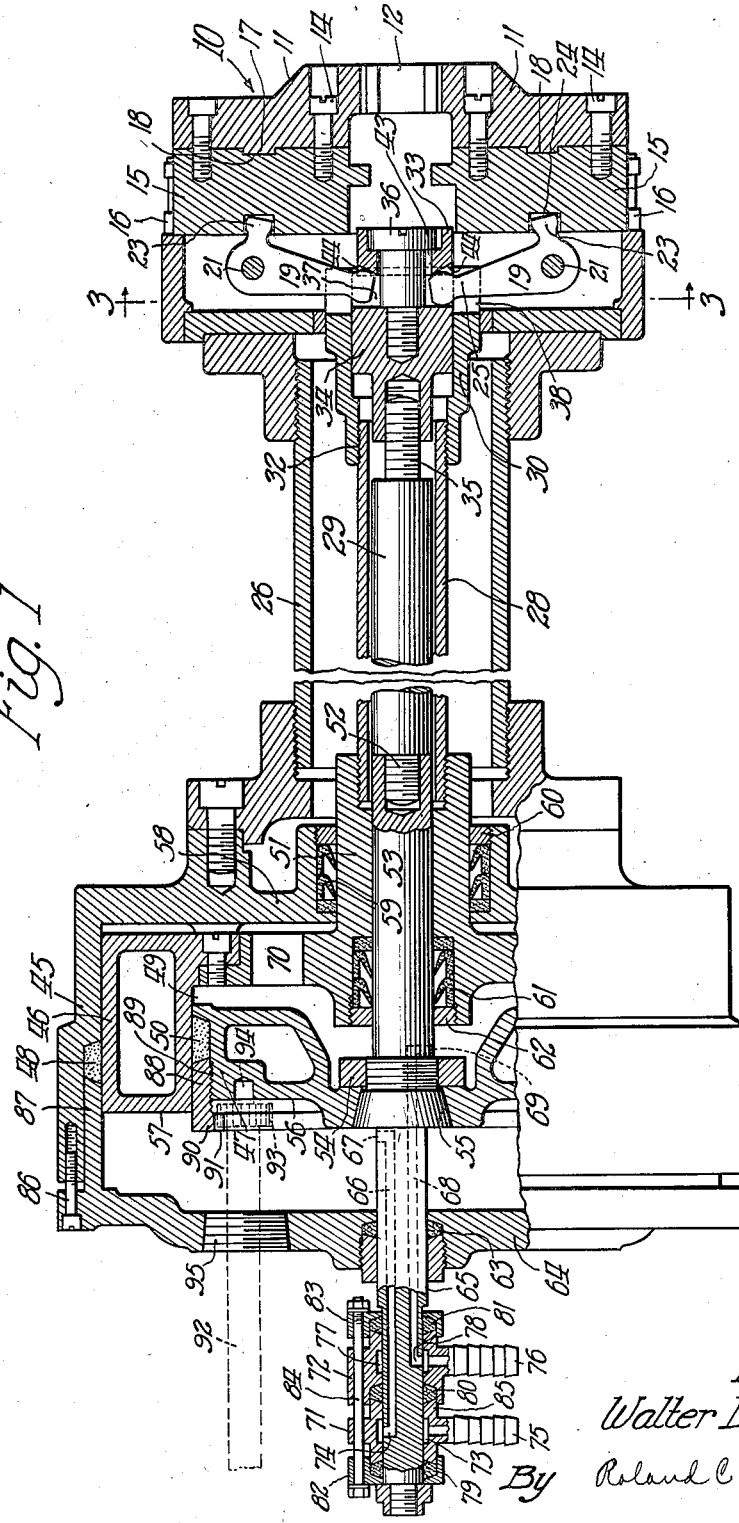

Patented Apr. 23, 1935

1,999,031

UNITED STATES PATENT OFFICE 1,999,031

WORK HOLDER

Walter David Burger, Forest Park, Ill., assignor to Hannifin Manufacturing Co., Chicago, Ill., a corporation of Illinois Application March 10, 1930, Serial No. 434,684

13 Claims. (Cl. 279—119)

This invention relates to work-holding devices, such as chucks, and power mechanism adapted among other purposes to actuate such devices. Among other objects, the invention aims to provide improved apparatus for more effectively holding pieces of work. Another object of the invention is to provide improved actuating mechanism capable of coordinated though independent movement.

The invention may be readily understood by reference to one form of apparatus embodying the invention and illustrated in the accompanying drawings.

In said drawings:

Fig. 1 is a longitudinal section of a chuck and its operating mechanism;

Fig. 2 is a section through the chuck, similar to that of Fig. 1 but taken on a plane (2—2 of Fig. 4) perpendicular to the plane of the section of Fig. 1;

Fig. 3 is a transverse section taken on the plane 3—3 of Fig. 1; and

Fig. 4 is a front elevation of the chuck.

The work-holding device is herein illustrated in the form of a duplex chuck 10, that is, a chuck having a plurality of gripping means (two in this case), such as pairs of jaws 11 and 12, adapted separately to grip an article 13, in plurality of planes. The jaws 11 and 12 which are of a character appropriate to the work to be gripped thereby, are removably mounted by bolts 14 upon blocks 15 slidable in appropriate radial guideways 16 in the chuck housing. The usual interlocking ribs and grooves 17 and 18 are provided for assuming the stresses developed by the gripping jaws. The respective pairs of jaws and jaw slides are moved radially in and out by pairs of levers 19 and 20 here shown in the form of bell cranks pivoted on pins or shafts 21, respectively supported by pairs of parallel webs 22 in the chuck housing. The extremities 23 of the bell cranks are headed and operatively engage the blocks in appropriately shaped recesses 24 in the rear faces thereof. Radial movement of the gripping jaws is thus effected by a relative axial movement of the arms 25 of the bell cranks which in this case are the longer arms, thereby multiplying the applied force at the jaws.

As here shown the chuck is rotatively carried on the hollow shaft 26, corresponding, for example, to the hollow shaft in a lathe, the bearings and mountings for which are omitted for the sake of clarity.

The operative movements of the jaws, while coordinated as regards their gripping function, are independent as regards range of movement, thereby enabling an article whose dimension in one gripping plane is not the same as that in another gripping plane, to be gripped. Among other advantages this enables the chuck more effectively to grip an article which has an elliptical or other non-circular section (that shown at 27 in Fig. 4 being an example) or one having a rectangular or analogous section. The above includes, of course, irregular sections such as those frequently encountered in castings intended to be of circular or other regular section but which sometimes unavoidably deviate from the pattern.

Such independent operation of the respective pairs of jaws is effected in the present case by controlling such pairs by a separate actuating means whose operation is co-ordinated in order to coordinate the action of the jaws as aforesaid. That is, one actuating device operatively engages the arms 25 for one pair of jaws and another actuating device independently controls the other pair of jaws. Such actuating devices are represented by draw bars or shafts here shown concentrically arranged, the bar 28 being tubular and the bar 29 being solid and located axially within the tubular bar. The bar 28 is connected to the arms 25 (controlling the pair of gripping jaws 12) by a sleeve 30 having recesses 31 in which the extremities of the arms 25 of levers 20 seat. The sleeve is internally threaded at 32 and screwed upon the end of bar 28. Longitudinal movement of such bar, therefore, actuates the pair of jaws 12.

The inner bar 29 is connected to the pair of jaws 11 by means of a collar 33 connected to but spaced from the plunger-like member 34 screwed upon a reduced end 35 of bar 29. A large sized machine screw 36 connects the collar 33 to the member 34. The extremities of the arms 25 of lever 19 are seated in the space 37 between the inner face of collar 33 and the end of the member 34, and therefore respond to the longitudinal movement of bar 29. To permit a compact arrangement of parts inside the chuck, the sleeve 30 is slotted as at 38 in registry with the arms 25 of levers 19, thereby permitting both sets of levers to be placed approximately in the same transverse location in the chuck body.

Independent but simultaneous tension applied respectively to the bars 28 and 29 causes the levers 19 and 20 to move the jaws inwardly so as operatively to grip a piece of work inserted therein. If the dimensions of the article to be gripped are not the same in the respective gripping planes, the arresting of movement of one pair of jaws by engagement with the article at its larger dimension does not prevent the other jaws from continuing to move so as also effectively to grip the article. Thus both pairs of jaws grip the article with maximum efficiency.

One pair of jaws may, as in the present case, be made compensating thereby more effectively to grip an article whose periphery is eccentric to the axis to be centered in the chuck. For example, in Fig. 4 the section of the article 13 at the gripping jaws is not only non-circular but its axis 39 (which is the center of the dotted circle 40) does not lie midway between the surfaces 41 and 42 to be gripped by the jaws 11, the surface 42 being a greater distance from the axis 39 than the surface 41. Ordinarily jaws are so adjusted that their gripping faces are spaced equi-distant from the axis of the chuck, and if no compensation were provided the axis 39 of the article could not be located to coincide with the axis of the chuck. The aforesaid compensating feature, however, permits the jaws 11 firmly to grip the article with its axis 39 coinciding with the chuck axis.

The aforesaid compensation or relative adjustment of the pair of jaws is permitted in this instance by constructing the collar 33 so as to be shiftable laterally. In this case the bore 43 of the collar through which the screw 36 passes is made substantially larger than the screw and the faces 44 on the collar which operatively engage the arms 25 are inclined relative to the axis of the actuating bar 29. Thus when one of the jaws engages the article to be gripped and its movement is thereby arrested, the camming action of the surface 44 against the lever controlling such jaw, forces the collar laterally, and the opposite camming surface 44 acts against the other lever 19 to effect a continuation of the movement of the other jaw until it engages the work. In other words, the compensating action continues (within the limits of the design) until both jaws offer approximately equal resistance to further movement.

The compensation feature of the chuck thus permits an article having an eccentric chucking surface to be registered with a given axis or "fixed center" and gripped in the chuck in this position. Where chucking on a "fixed center" is unnecessary, the compensating feature need not be embodied in the chuck. That is, the jaw actuating member need not be made movable relative to the jaw actuating levers. Without such compensating feature respective pairs of jaws of the chuck nevertheless each operate effectively to grip and center the work relative to surfaces engaged by the jaws irrespective of differences in diameter of the work at such surfaces.

The actuating bars 28 and 29 are given the independence necessary to effect the aforesaid independent gripping action, by a device which is automatically adjustable to permit such independent though coordinated movement of the bars.

Apparatus appropriate for this purpose comprises a pair of pistons actuated by a simultaneously applied pressure medium, air pressure in the present case. These pistons are here shown as located in a single cylinder 45 and are embodied in the form of coaxial pistons 46 and 47. The outer piston 46 operates along the inner surface of the cylinder for which piston packing 48 is provided. The inner piston 47 operates within a cylindrical recess 49 formed in the outer piston and is provided with piston packing 50. The outer piston is formed with a hollow hub 51 into which is screwed the operating tubular bar 28. The bar 29 is provided with a reduced end 52 which is screwed into piston rod 53 and connected by the nut 54 and tapered collar 55, to piston 47.

The faces 56 and 57 of the inner and outer pistons respectively are of such a size as to cause approximately equal force to be delivered to the respective pairs of gripping jaws. Owing to the fact that the outer piston may be subjected to more frictional resistance than the inner piston, it can advantageously be made of slightly larger effective area to offset the friction loss and thereby to deliver an equal force to the gripping jaws. The cylinder head 58 is provided with stuffing box 59 for the hub 51, the packing of which is held in place by an appropriate nut 60. The piston rod 53 is packed in passing through the outer piston by packing 61 held in place by packing nut 62. A stuffing box 63 is provided in the cylinder head 64 for the end section 65 of the piston rod.

Air pressure is introduced into the cylinder through the bore 66, terminating at 67, in piston rod 65. The bore 68 communicating at 69 with the space to the rear of the inner piston provides a relief or exhaust passage to vent the opposite faces of the pistons. Such passage communicates with the opposite face of the outer piston through the opening 70 in the web of the outer piston.

When the foregoing apparatus is employed in a lathe, for example, the entire construction (with the exception of that presently to be described) rotates with the shaft 26. The pressure fluid is introduced and released from the rotating controlling cylinder through the rotating shaft 65 by means of housings 71 and 72, the former communicating with the passage 66 and the latter with the passage 68. The circular passage 73 in the inner face of housing 71 which registers with the extremity 74 of passage 66, is provided with a hose connection 75 by means of which pressure fluid may be introduced to or released from the cylinder. A similar hose connection 76 communicates through the circular passage 77 with the extremity 78 of passage 68. The respective housings are packed against leakage to the exterior and leakage from one to the other by packings 79, 80, and 81. The packings are compressed by packing sleeves 82 and 83 which are drawn together by bolts 84. It will be noted that the portion 85 of housing 71 telescopes with housing 72 and engages the intermediate packing 80,— thus the bolts 84 serve not only to compress the outer packings but the intermediate packings. The hose connections 75 and 76 are connected by appropriate pipes or hose to pressure supply means and control valves by means of which pressure fluid may be introduced into the operating cylinder 45 to operate the chucks to grip an article,—at which time the passage 68 is vented to the exterior; also pressure may be introduced through connection 76 to the rear faces of the pistons to release the chuck (i. e. separate the jaws),—at which time the outlet 75 is opened to the atmosphere to vent the opposite faces of the piston.

The packing 48 is compressed or adjusted by bolts 86 which force the inner cylindrical flange 87 on the piston head into contact with the packing. This provides means also for renewing the packing by removal of the piston head.

The packing 50 may be tightened by a packing nut 88 screw threaded at 89 to the inner piston. The inwardly projecting flange 90 on the packing nut is provided with a series of gear teeth 91 by means of which the nut may be rotated relative to the inner piston without removal of the piston head. This is effected by inserting a tool (indicated in dotted lines at 92) having a pinion 93 and stud 94 thereon, into the cylinder so that the stud 94 enters one of a series of recesses in the piston and the pinion 93 meshes with the gear teeth 91. Rotation of the tool 92 thereupon causes a rotation of the nut 85 on the piston. The removable plug 95 is provided to permit insertion of the tool.

Obviously the invention is not limited to the details of the illustrative construction since these may be variously modified. Moreover it is not essential that all features of the invention be used conjointly since various features may be advantageously used (without the others) in different combinations and sub-combinations.

Having described my invention, I claim:

1. In apparatus of the character described the combination comprising a chuck having a plurality of independently movable pairs of jaws, actuating bars operatively connected to said jaws, an operating cylinder, pistons in said cylinder and connected to said respective bars, and means for introducing an actuating fluid into said cylinder to operate said pistons.

2. In apparatus of the character described the combination comprising a chuck having a plurality of independently movable pairs of jaws, actuating bars operatively connected to said jaws, an operating cylinder, concentric pistons in said cylinder and connected respectively to said bars, and means for introducing an actuating fluid into said cylinder.

3. In apparatus of the character described the combination comprising a chuck having a plurality of independently movable pairs of jaws, actuating bars operatively connected to said jaws, an operating cylinder, inner and outer pistons in said cylinder connected respectively to said bars, and means for introducing an actuating fluid into said cylinder.

4. In apparatus of the character described the combination comprising a rotary chuck having a plurality of independently movable pairs of jaws, actuating bars operatively connected to said jaws, a rotating operating cylinder, pistons in said cylinder and respectively connected to said bars, and a stuffing box associated with said rotating cylinder to permit the introduction of an actuating fluid into said cylinder.

5. In apparatus of the character described the combination comprising a work holder having a plurality of gripping jaws, independent jaw actuating bars, and pistons connected with the respective bars to provide power for moving said bars, and means for delivering an actuating fluid to said pistons to maintain said pistons simultaneously under pressure.

6. In apparatus of the character described the combination comprising a chuck having a plurality of independent pairs of jaws, operating bars for actuating the respective pairs of jaws, coaxial pistons connected with said bars for applying power to said jaws, and means for delivering actuating fluid simultaneously to said pistons.

7. Mechanism of the character described comprising in combination a power cylinder, independent coaxial pistons in said cylinder, independent piston rods connected with the respective pistons, fluid supply means for delivering pressure fluid to each of said pistons to maintain said pistons simultaneously under pressure.

8. Mechanism of the character described comprising in combination, a rotary cylinder, an annular piston therein, an inner piston operating within said annular piston, said pistons together presenting a piston surface, coaxial actuating bars connected respectively to said pistons, said cylinder being provided with a stuffing box through which said bars pass, and means for introducing an actuating fluid into said cylinder.

9. In apparatus of the character described the combination comprising a device having a plurality of independently movable pairs of jaws, an operating cylinder having a plurality of concentric pistons therein, means connecting the pistons with the respective pairs of jaws, and fluid pressure means connected with said cylinder to subject said pistons simultaneously to pressure.

10. In apparatus of the character described the combination comprising a chuck, having a pair of cooperating chuck jaws, a pair of operating levers associated with said jaws for moving the same in and out, a jaw actuating member, and a movable connecting member operatively connected with said levers and having a movable connection with said jaw actuating member whereby one of said levers may be moved by said actuating member while the other is at rest.

11. In apparatus of the character described the combination comprising a chuck having a plurality of independently movable pairs of jaws, actuating mechanism operatively connected with each of said pairs of jaws, and means associated with one of said pairs of jaws to permit one jaw member to move independently of its mate whereby to enable said pair of jaws to grip a piece of work having an eccentric exterior surface.

12. In apparatus of the character described the combination comprising a work holder having a plurality of movable work engaging jaws, jaw actuating mechanism for simultaneously actuating said jaws, and independent relatively movable members operated by said actuating mechanism and connecting the actuating mechanism with said jaws to coordinate the movement of said jaws and to permit one jaw to move independently of another jaw farther inwardly than said other jaw in order to center an object requiring non-uniform jaw spacing.

13. Apparatus of the character described comprising in combination a chuck having a plurality of independent pairs of jaws, levers connected with each of said pairs of jaws for moving the same throughout their operative range of travel, operating devices connected with said levers for moving said jaws, and actuating mechanism for actuating said operating devices to permit the jaws to be moved independently.

WALTER DAVID BURGER.